United States Patent [19]
Sanguu et al.

[11] 3,742,132
[45] June 26, 1973

[54] DRUM SERVO SYSTEM OF A VIDEO TAPE RECORDER FOR AN ELECTRONIC EDITING

[75] Inventors: Isao Sanguu; Tatsuo Konishi, both of Tokyo, Japan

[73] Assignee: Nippon Electric Company, Limited, Tokyo, Japan

[22] Filed: May 20, 1971

[21] Appl. No.: 145,163

[30] Foreign Application Priority Data

May 23, 1970 Japan ................................ 45/44321

[52] U.S. Cl. ...... 178/6.6 P, 178/6.6 A, 178/6.6 TC, 179/100.2 B

[51] Int. Cl. ........................................... G11b 27/08

[58] Field of Search ...................... 178/6.6 P, 6.6 A, 178/6.6 TC; 179/100.2 E, 100.2 B, 100.2 T

[56] References Cited

UNITED STATES PATENTS

| | | | |
|---|---|---|---|
| 3,651,276 | 3/1972 | Clark | 178/6.6 P |
| 3,654,387 | 4/1972 | Louth | 178/6.6 P |
| 3,671,655 | 6/1972 | Kosaka | 178/6.6 P |
| 3,017,462 | 1/1962 | Clark et al. | 178/6.6 P |

*Primary Examiner*—Bernard Konick
*Assistant Examiner*—Stuart N. Hecker
*Attorney*—Sandoe, Hopgood and Calimafde

[57] ABSTRACT

A drum servo system for electronic editing of television signals in a video-tape recorder in which the phase difference between a previously recorded reproduced signal, and a new recording signal is detected. The phase of the reproduced signal is shifted in response to that detection such that the phase of the reproduced signal is locked to that of the recording signal.

7 Claims, 2 Drawing Figures

Figure 1:
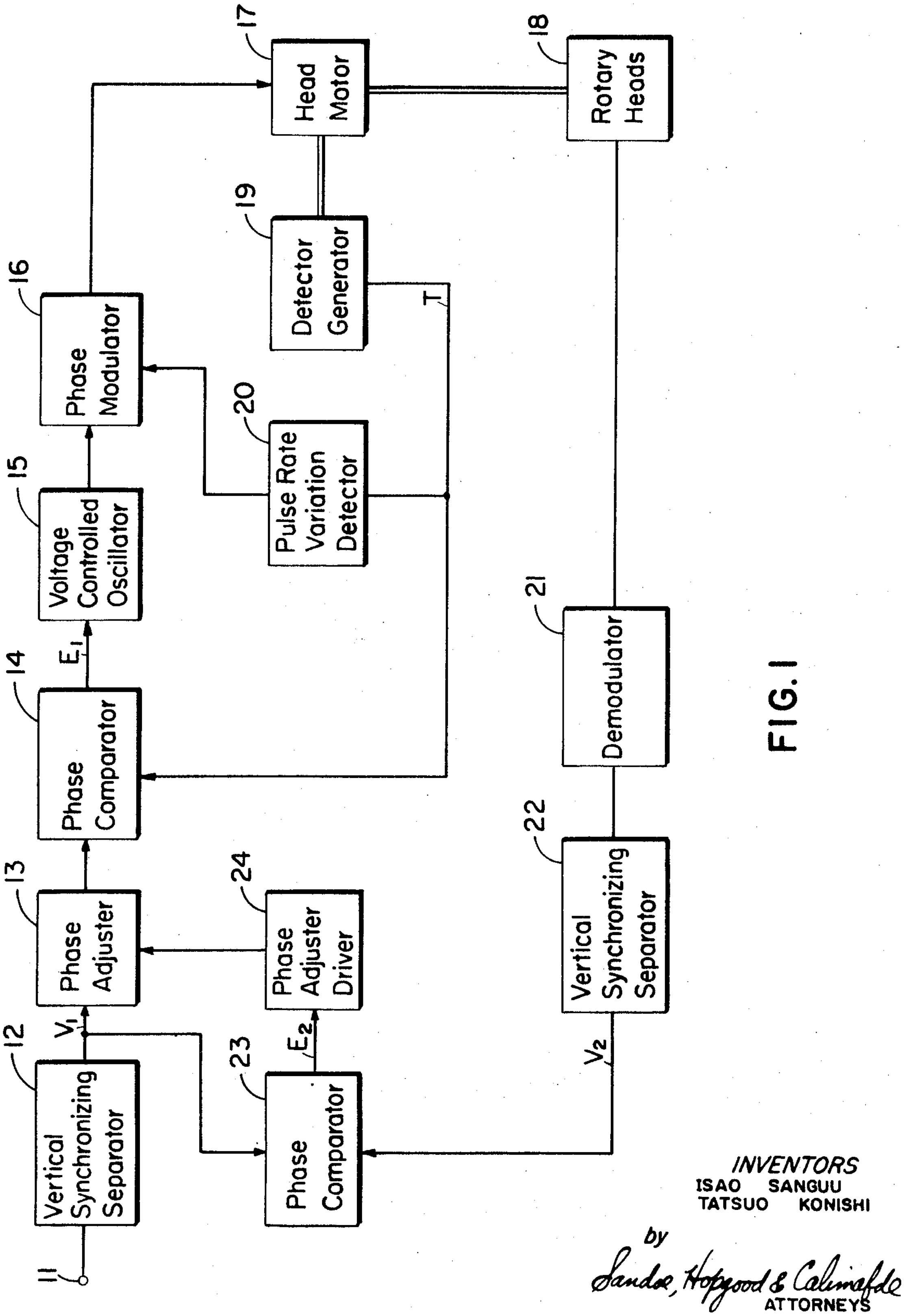

INVENTORS
ISAO SANGUU
TATSUO KONISHI
by
Sandoe, Hopgood & Calimafde
ATTORNEYS

INVENTORS
ISAO SANGUU
TATSUO KONISHI by Sandoe, Hopgood & Calimafde
ATTORNEYS

DRUM SERVO SYSTEM OF A VIDEO TAPE RECORDER FOR AN ELECTRONIC EDITING

This invention relates generally to drum servo systems for use in a video tape recorder, and more particularly to a drum servo system for electronic editing in a four-head video tape recorder for a television signal.

A four-head video tape recorder has four heads mounted in quadrature relationship on a rotatable disc rotated by a direct-coupled head motor nominally at a speed of 240OHz (14,400 rpm), for recording or reproducing the video signals onto or from a magnetic tape recording medium. A detector/generator is coupled to the head motor shaft to detect the phase of rotation of the rotary heads to generate pulses designated the tachometer pulses which represent the phase of rotation. The tape is fed by a capstan driven by a capstan motor, nominally at a speed of 15 inches/second. After the video signals are recorded, the control track signals and the audio signals are recorded on the tape by the respective fixed heads, which also serve to reproduce the control and the audio signals. The control track records the frame pulses of the video signals and the sinusoidal signal which is formed of the tachometer pulses to represent the phase of rotation of the rotary heads.

On recording, the head motor is driven by a head motor driving signal produced by an oscillator in synchronism with the vertical synchronizing signals of the video signal being recorded. The synchronism is achieved by a servo loop called the drum servo for controlling the phase of the driving signal.

Electronic editing of television programs is often resorted to at the present time. In electronic editing a plurality of programs are contiguously recorded on a magnetic tape to form a continuous program. Electronic edition may either be assembly edition in which a program is recorded following an already recorded program, or insert edition in which, a program is substituted for a portion of an already recorded program. The requisite in electronic edition is to reduce the disturbance or shock which appears in the reproduced picture when the working rotary head traverses the point of edition (the junction between two contiguous partial programs).

On carrying out insertion edition, only the video and audio signals of the already recorded program are erased while the control track signal thereof is used to operate a capstan servo to make the rotary heads record the new video signals, performing correct tracking, along the former video tracks from which the former video signals have just been erased.

In assembly edition, the already recorded program is reproduced until the edition point is reached, from where the video tape recorder is switched to the state of recording.

In electronic editing, it is necessary to lock the phase of the reproducing signal with the phase of the recording signal so as to obtain continuity of the reproduced pictures before and after the point of edition, otherwise a fluctuation of the reproduced picture will occur at the point of edition.

In a conventional four-head video tape recorder, the phase of the reproduced signal is locked to the phase of the recording signal by manually adjusting a phase-adjuster of a drum servo system. Therefore, it is necessary to manually adjust the phase of the reproduced signal each time the recording signal is changed to another signal.

It is therefore an object of this invention to provide a drum servo system for electronic editing in which the phase of the reproduced signal is automatically locked to the phase of the recording signal.

According to this invention, there is provided a drum servo for electronic editing in which the phase difference between the reproduced signal and the recording signal is detected and the phase of the reproduced signal is shifted by using a detected signal, whereby the phase of the reproduced signal is locked to the phase of the recording signal.

Figure 2:
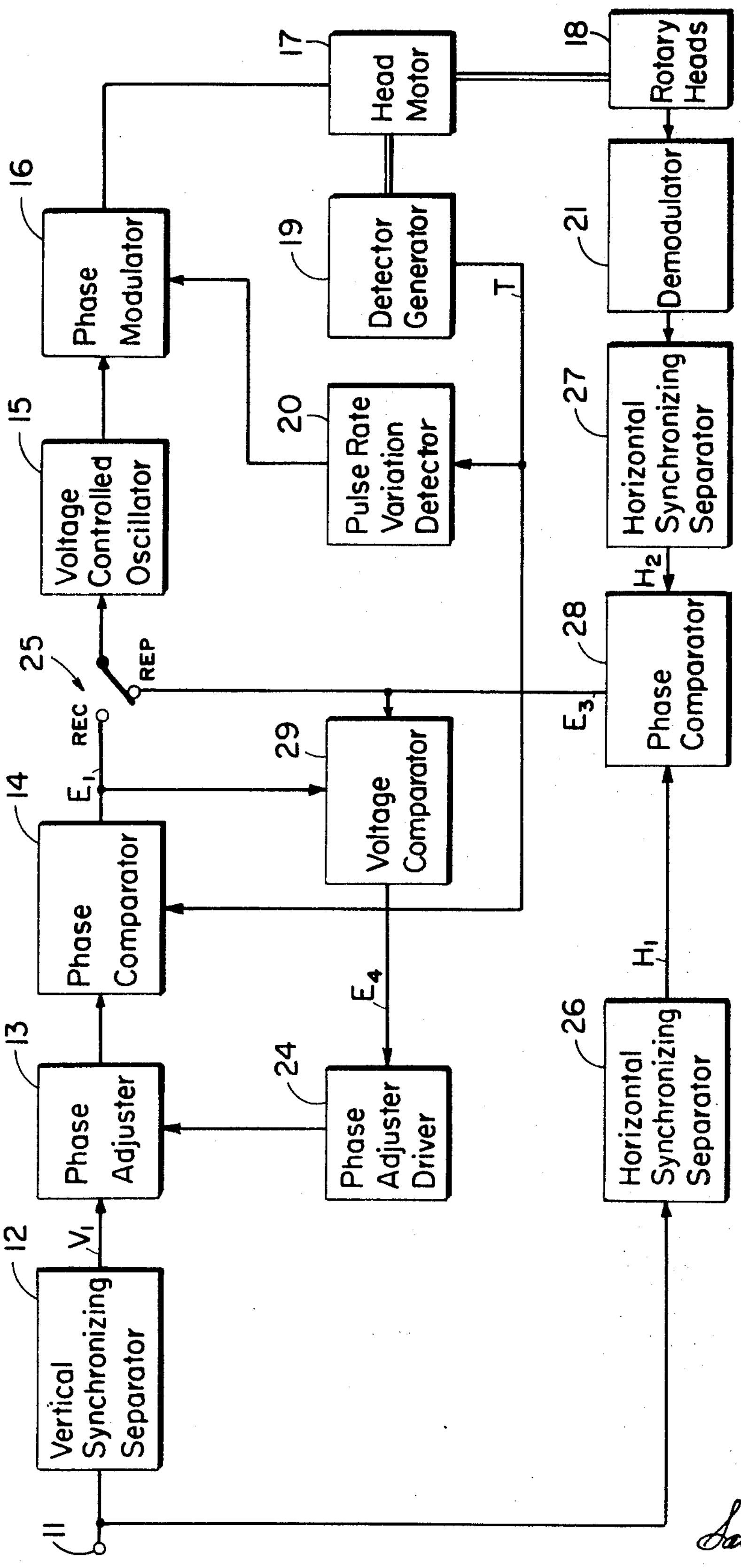

Now the features and advantages of this invention will be clearly understood from the detailed description of a preferred embodiment of this invention taken in connection with the accompanying drawings, wherein:

FIG. 1 is a schematic block diagram of a preferred embodiment of this invention; and FIG. 2 is a schematic block diagram of an another embodiment of this invention.

Referring to FIG. 1, a drum servo for a four-head video tape recorder comprises an input terminal 11 receiving for a television recording signal which is to be inserted after the point of edition. A vertical synchronizing signal separator 12 is coupled to terminal 11 for deriving a vertical synchronizing signal $V_1$ from the video signal, and a phase adjuster 13 is coupled to the output of signal separator 12 for adjusting the phase of the vertical synchronizing signal $V_1$ by means of a control which will be described hereinafter. Phase adjuster 13 may be either a monostable multivibrator, a resolver, or a similar device for variably delaying the input signal. A phase comparator 14 coupled to the output of phase adjuster 13 compares the phase of the phase-adjusted vertical synchronizing signal and the tachometer pulses T which are generated in a manner to be described below to produce at its output an error voltage $E_1$ representative of the phase difference between the two input signals. By way of example, the error voltage $E_1$ is zero when there is no phase difference between these signals. A voltage controlled oscillator 15 coupled to the output of phase comparator 14 receives the error voltage $E_1$ from the comparator 14 as the control voltage to produce an oscillatory signal of 240Hz when the control voltage is zero. A phase modulator 16 is coupled to the output of oscillator 15 for modulating the phase of the oscillatory signal for a purpose to be described in a later part of the specification to derive a head motor driving signal for a head motor 17 directly coupled with rotary heads 18 A detector/generator 19 is coupled with the head motor shaft for detecting the phase of rotation of the shaft or the rotary heads 18 to generate tachometer pulses T representative of the phase of rotation. Usually, the oscillator 15 is an LC oscillator or an astable multivibrator which produces the oscillatory signal whose frequency is dependent on the voltage of the control signal applied thereto. The head motor 17 may be a synchronous motor of the hysteresis type. The drum servo yet further comprises a pulse rate variation detector 20 coupled to the output of detector/generator 19 which detects the variation in the pulse rate of the tachometer pulses T and supplies the output signal to the phase modulator 16. When the frequency of the oscillatory signal increases to accelerate the head motor 17, the phase modulator 16 delays the phase of the motor driving signal to reduce this acceleration. The damping servo loop comprising the phase modulator 16, the head motor 17, the detector/generator 19, and the pulse rate variation detector 20 thus applies damping to the motor speed variation to prevent hunting of the head motor 17.

According to this invention, a demodulator 21 coupled to rotary heads 18 demodulates the output signal of the rotary heads to derive the reproduced television signal, and a vertical synchronizing signal separator 22 coupled to demodulator 21 derives the vertical synchronizing signals $V_2$ from the reproduced television signals. A phase comparator 23 coupled to synchronizing separators 12 and 22 compares the phases of the vertical synchronizing signals $V_1$ and $V_2$ derived from the vertical synchronizing signal separators to produce the error voltage $E_2$ representative of the phase difference between the two vertical synchronizing signals $V_1$ and $V_2$, and a phase adjuster driving means 24 coupled to the output of phase comparator 23 drives phase adjustor 13 so as to reduce the phase difference between the vertical synchronizing signals $V_1$ and $V_2$ of the recording signal to be inserted and the reproduced signal. The phase adjuster driving means 24 may be a motor, an electronic variable element, or a similar device for changing the delay time of the phase adjuster 13.

During the reproduction of the already recorded program, the head motor is controlled by the drum servo described above, and the video tape recorder reproduces the already recorded program. When the point of edition is reached, the video tape recorder is switched to the state of recording and records the recording signal to be inserted while maintaining the phase relationship by cutting off the rotation of the phase adjuster driving motor or by holding the phase adjuster driving signal.

When an other recording program having a different phase is applied to input terminal 11, phase comparator 23 derives the error voltage, which causes phase adjuster 13 to change the dealy time whereby the phase of the reproduced signal of the already recorded signal is locked to the phase of the other recording program.

Referring to FIG. 2, a drum servo according to another embodiment of this invention comprises an input terminal 11, a vertical synchronizing signal separator 12, a phase adjuster 13, and a phase comparator 14 as in the embodiment of FIG. 1. The embodiment of FIG. 2 further includes, a switch 25 having a recording (editing) and reproducing fixed contacts REC and REP and a movable contact coupled to the control terminal of voltage oscillator 15. A phase modulator 16, a head motor 17, rotary heads 18, a detector/generator 19, and a pulse rate variation detector 20 are included in the latter embodiment as in the FIG. 1 embodiment. A horizontal synchronizing signal separator 26 coupled to input terminal 11 dervies the horizontal synchronizing signals $H_1$ from the recording signals applied to the input terminal 11. A demodulator 21 coupled to rotary heads 18 is also coupled to, a horizontal synchronizing signal separator 27 which derives the horizontal synchronizing signals $H_2$ from the demodulated signals, an a phase comparator 28 compares the phases of the two horizontal synchronizing signals $H_1$ and $H_2$ to produce an error voltage $E_3$ which is applied to the REP contact of switch 25 and to a voltage comparator 29. The latter compares the error voltages $E_1$ and $E_3$ derived from the phase comparators 14 and 28, respectively. A phase adjuster driving means 24 is coupled to the output of voltage comparator 29 and to the input of phase adjuster 13.

During the reproduction of an already recorded program, switch 25 is contacted to the contact REP and the head motor is controlled by the servo loop comprising the phase comparator 28, the voltage controlled oscillator 15, the head motor 17 and the rotary heads 18, while the voltage comparator 29 compares the voltages $E_1$ and $E_3$. When the point of edition is reached, switch 25 is changed to the contact REC and the delay time of the phase adjuster 13 is held to the value at the time of switching.

What is claimed is:

1. A drum servo system for a four-head video tape recorder comprising:

an input terminal for receiving the synchronizing signal of a recording television signal to be edited;

first phase comparator means for comparing the phases of said synchronizing signal and the phase of rotation of a head motor to produce an error signal representative of the phase difference between said synchronizing signal and the phase of rotation of said head motor;

frequency controllable oscillator means responsive to said error signal for producing an oscillatory signal whose frequency is determined by said error signal, said head motor being driven by said oscillatory signal;

detector/generator means coupled to the head motor shaft for generating a tachometer pulse representative of the phase of rotation of said head motor;

rotary head means coupled to said head motor for reproducing a previously recorded television signal during a first time period and for recording said recording television signal during a second time period;

second phase comparator means coupled between said input terminal and said rotary head means for comparing during said first time period the phases of the synchronizing signals of said recording television signal and said reproduced signal derived from said rotary head means to produce a second error signal representative of the phase difference between the synchronizing signals of said recording television signal and said reproduced signal;

phase adjusting means coupled between said input terminal and said first phase comparator means for adjusting the phase of said recording signal by means of said second error signal of said second phase comparator means; and phase adjuster driving means coupled between said second phase comparator means and said phase adjusting means for maintaining the adjusted phase of said recording television signal during said second time period.

2. The system of claim 1, further comprising switching means having first and second contacts coupled respectively to the outputs of said first and second phase comparators, and a third contact coupled to the input of said frequency controllable oscillator means and selectively movable into contact with said first and second contacts.

3. The system of claim 2, further comprising voltage comparator means having an output coupled to said driving means and an input coupled to the outputs of said first and second phase comparator means for comparing the outputs of said first and second phase comparing means.

4. The servo system of claim 1, further comprising demodulator means coupled between said rotary head means and said second phase comparator means.

5. The servo system of claim 4, further comprising phase modulator means coupled between said frequency controllable oscillator means and said head motor for modulating the phase of said oscillatory signal.

6. The servo system of claim 5, further comprising variation detector means coupled between said detector/generator means and said phase modulator means for detecting the variation in the frequency of said tachometer pulses.

7. The servo system of claim 6, in which said phase modulator, said head motor, said detector/generator means and said variation detector means comprise a damping servo loop for applying damping to the variation in the speed of said head motor.

* * * * *